United States Patent [19]

Baiker

[11] Patent Number: 5,024,465
[45] Date of Patent: Jun. 18, 1991

[54] AXLE SUSPENSION FOR VEHICLES, PARTICULARLY HEAVY VEHICLES WITH TWO OR MORE AXLES

[76] Inventor: Walter Baiker, Chälenstrasse 2, 8433 Weiach, Switzerland

[21] Appl. No.: 271,756
[22] PCT Filed: Feb. 9, 1988
[86] PCT No.: PCT/CH88/00032
§ 371 Date: Dec. 7, 1988
§ 102(e) Date: Dec. 7, 1988
[87] PCT Pub. No.: WO88/06106
PCT Pub. Date: Aug. 25, 1988

[30] Foreign Application Priority Data

Feb. 12, 1987 [CH] Switzerland ............... 531/87

[51] Int. Cl.⁵ .............. B60G 11/26; B60G 11/62
[52] U.S. Cl. .................. 280/840; 280/6.12; 280/708; 267/64.13; 267/64.26
[58] Field of Search .......... 280/840, 6.12, 704, 280/708, 709, 711, 111; 188/269; 267/64.13, 64.26

[56] References Cited

U.S. PATENT DOCUMENTS

| | | | |
|---|---|---|---|
| 2,030,263 | 2/1936 | Mercer, Jr. ............... | 280/724 |
| 2,094,882 | 10/1937 | Garnett et al. ............ | 280/104 |
| 3,007,694 | 11/1961 | Bingaman ................. | 267/64.26 |
| 3,083,000 | 3/1963 | Perdue .................... | 267/64.26 |
| 3,782,755 | 1/1974 | Spichala .................. | 280/840 |
| 4,029,306 | 6/1977 | Sakaguchi et al. ......... | 267/64.26 |
| 4,152,004 | 5/1979 | Schröder ................. | 280/6.12 |
| 4,491,338 | 1/1985 | Sheldrake ................ | 280/405.1 |
| 4,807,860 | 2/1989 | Simons ................... | 280/709 |
| 4,859,006 | 8/1989 | Philippe et al. ........... | 267/64.13 |

FOREIGN PATENT DOCUMENTS

| | | | |
|---|---|---|---|
| 318817 | 6/1989 | European Pat. Off. ...... | 267/64.13 |
| 1192881 | 5/1965 | Fed. Rep. of Germany ... | 267/64.13 |
| 2417190 | 10/1975 | Fed. Rep. of Germany ... | 267/64.26 |
| 384565 | 4/1908 | France . | |
| 2152351 | 4/1973 | France . | |
| 2249265 | 5/1975 | France . | |
| 2477478 | 9/1981 | France . | |
| 2503055 | 10/1982 | France . | |
| 613007 | 11/1960 | Italy ...................... | 267/64.26 |
| 978944 | 1/1965 | United Kingdom . | |

*Primary Examiner*—Charles A. Marmor
*Assistant Examiner*—T. Finlay
*Attorney, Agent, or Firm*—Walter C. Farley

[57] ABSTRACT

The axle suspension for vehicles, particularly heavy and special vehicles, has an axle housing connection using two telescopic assemblies (26, 20, 21, 24, 87) each having a telescopic cylinder (6, 95) and a telescopic tube (2, 23, 43, 91) displaceable therein with a working piston (20, 44, 55, 82) at one end and a hinged connection (3) at the other. The telescopic cylinder (6, 95) as a mounting tube is fixed to the chassis (5) and the telescopic tube (2, 23, 43, 91) is connected in articulated manner to axle (4), in such a way that the axle is pivotable at right angles to the vehicle, but cannot be rotated about its own axis. The telescopic assemblies guiding the axle (4) accomplish the vehicle suspension, as well as vertical adjustment and slope compensation of the vehicle.

14 Claims, 5 Drawing Sheets

AXLE SUSPENSION FOR VEHICLES, PARTICULARLY HEAVY VEHICLES WITH TWO OR MORE AXLES

The invention relates to the field of vehicle technology and to an axle suspension.

BACKGROUND OF THE INVENTION

In heavy vehicles such as fire engines, mobile cranes, special vehicles, heavy military vehicles, etc. it has hitherto been conventional practice to construct the suspension and the so-called terrain compensation for travelling over ground unevennesses using heavy leaf springs or leaf spring sets. It is advantageous in such a relatively simple suspension system that the longitudinal and transverse guidance of the axles is, so-to-speak, integrated free into the system. The heavy leaf spring sets are also able to absorb the often powerful rotary forces on the axle body occurring on braking and starting with a heavy vehicle.

However, disadvantages exist because such leaf spring sets are heavy, have a relatively small spring displacement and their elasticity decreases relatively rapidly. In addition, leaf spring systems cannot be switched over for the extreme operating conditions of empty weight on the one hand and heavy (maximum) loading on the other.

In addition, in the case of a leaf spring system neither a vertical adjustment of the vehicle, nor a slope compensation can be incorporated. The leaf spring elements require too much space on installation and reduce the obliquity of the wheels on the guided axles. Leaf spring systems also have a prejudicial effect on the headroom of a vehicle, i.e. the latter or the height of its loading surfaces necessarily become too high and this leads to serious disadvantages, such as the risk of tilting through the also high centre of gravity.

Attempts have been made to obviate these disadvantages by a number of measures, such as single wheel suspensions, etc. However, single wheel suspensions have proved unsuccessful for heavy vehicles, because very large forces occur on the wheels (force transmission and braking), which cannot easily be absorbed. Usually there is also not adequate space between the wheels, the axles and on the vehicle body to permit the fitting of such mechanisms with the necessary dimensions.

SUMMARY OF THE INVENTION

An object of the present invention is to obviate the aforementioned disadvantages. It is a further object of the invention to provide an axle suspension, which simultaneously permits slope compensation for the vehicle.

Briefly described, the invention comprises an axle suspension forming the suspension connection between an axle housing and the chassis of a heavy or special vehicle having a longitudinal axis. At least two mounting tubes are fixedly attached to the vehicle chassis and a telescopic assembly is operatively associated with each of the mounting tubes. Each telescopic assembly comprises a jacket tube enclosed in the mounting tube, a layer of resilient, elastic material between and in contact with the jacket tube and the mounting tube and a telescopic tube axially displaceable within said jacket tube. At one end of the telescopic tube is a working piston slidable within the jacket tube, and a pivot connection is at the other end of the telescopic tube connected to the axle housing such that the housing is pivotable only about an axis parallel to the longitudinal axis of the vehicle.

BRIEF DESCRIPTION OF THE DRAWINGS

The invention is described in greater detail hereinafter relative to non-limitative embodiments and the attached drawings, wherein.

DESCRIPTION OF THE PREFERRED EMBODIMENTS

Figure 1:
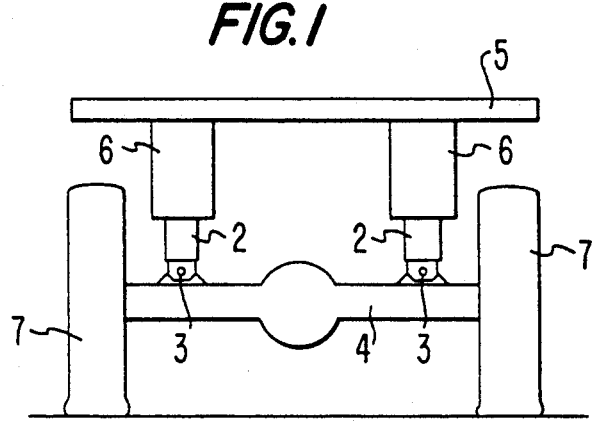
FIG. 1 is a schematic front elevation of an axle carrying the wheels and which is detachably connected to the telescopic assemblies on which the vehicle frame is carried by joint bolts.

The present invention removes a large number of disadvantages regarding axle guidance in connection with known heavy vehicles. By means of two telescopic assemblies used as telescopic spring legs 2 and which are connected by suitable hinged connections 3 to the vehicle axle 4, both the torsional force of axle 4 occurring on braking and starting and the longitudinal and transverse forces are absorbed and transferred to the vehicle frame 5 via mounting tubes 6, in which are arranged the telescopic cylinder with the working piston and the telescopic tube. Simultaneously the vehicle suspension is integrated into the novel axle guidance system. The suspension can be hydraulic, pneumatic or a combination thereof.

It is also possible to integrate into an embodiment of the aforementioned hydraulic suspension a vertical adjustment of the vehicle, as well as adequate terrain compensation, i.e. a "slope compensation capability".

FIG. 1 diagrammatically shows an axle 4 with wheels 7. The axle is detachably and pivotably connected by joint bolts to two telescopic assemblies essentially comprising telescopic tube 2 and the guide or mounting tube 6, which are described in detail relative to FIGS. 2, 4, 5 and 8. The telescopic tubes 2 connected to axle 4 are, as will be shown hereinafter, guided in additional jacket tubes 24, 52, 90, in which they can slide up and down. Between the jacket tubes acting as guide tubes and the mounting tubes 6, 95 fixed to the vehicle frame 5 is provided an elastic, resilient layer 25, 53, e.g. of rubber or elastic plastic, which can compensate for assembly differences on the one hand and impacts occurring laterally on the axle on the other. Moreover, this compensating layer, which is only a few millimeters thick, must also be able to compensate for spacing differences, which occur on the king pins or joint bolts 3 occurring on the vehicle in the sloping position when horizontal compensation takes place, as shown in FIG. 6. The distance between the bolts 3 (FIG. 6) thereby decreases somewhat. The damping, resilient layer also has a positive effect on starting and braking and prevents the transfer of the noise-producing movements of the axles, particularly the driven axles with their heavy drive units.

Figure 2:
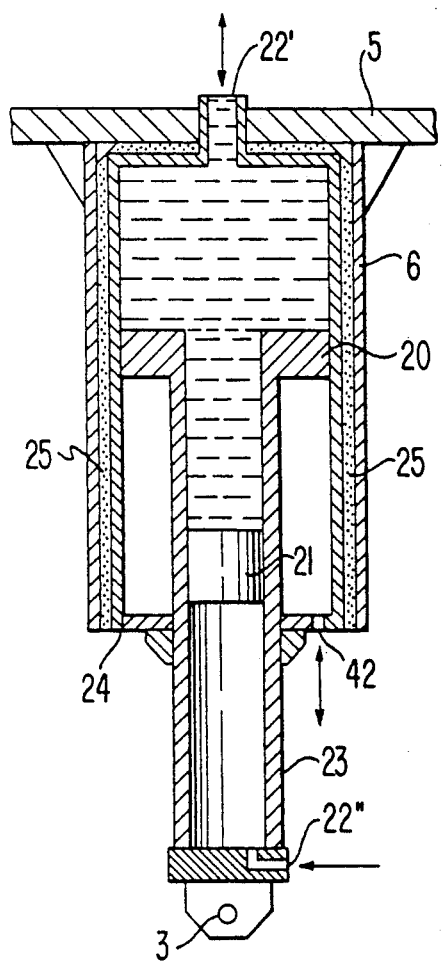
FIG. 2 is a front elevation, in section, of a first embodiment of a telescopic assembly in accordance with the invention with integrated oleo-pneumatic or gas suspension.

This is shown in greater detail in FIG. 2 which shows a simple embodiment of the telescopic assembly by means of an oleo-pneumatic or gas suspension integrated into the telescopic tube. The mounting tube 6 is fixed to the vehicle frame 5. By means of resilient layer 25, mounting tube 6 is connected to the guide tube 24. This makes it possible for the second jacket or guide tube 24 and the telescopic tube guided therein to oscillate at right angles to the longitudinal axis of the vehicle to such an extent that the aforementioned spacing modification of the articulation points 3 during sloping of the axle can be compensated for as shown in FIG. 6. Within jacket tube 24, telescopic tube 23 is connected to a hydraulic piston 20 and also has in its interior a further piston 21, so that a double function is possible. Thus, the jacket tube with the axle-guiding telescopic tube becomes a component similar to a double-acting hydraulic cylinder. Through the supply or removal of a fluid, the fluid supplies 22', 22" also make it possible to raise or lower the vehicle.

Figure 3:
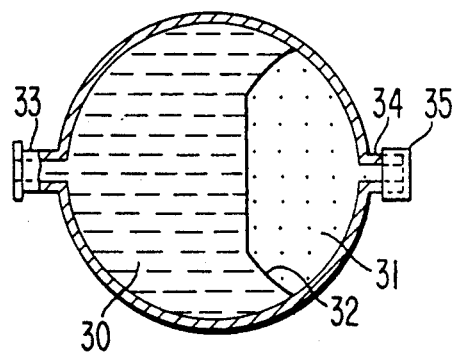
FIG. 3 is a sectional view of a hydraulic spring accumulator, as used in conjunction with the invention.

FIG. 3 shows a hydraulic spring accumulator, whose one side 30 is under oil pressure and whose other side 31 is under air or gas pressure. Between them is located a diaphragm 32, which is preferably made from rubber. The working fluids can be supplied or removed by inlet and outlet connections 33, 34. The presently represented spring accumulator has a compressible gas space or zone 31 sealed in gas tight manner by a closure 35 and which is compressed to a greater or lesser extend by varying the liquid pressure in chamber 30.

Figure 4:
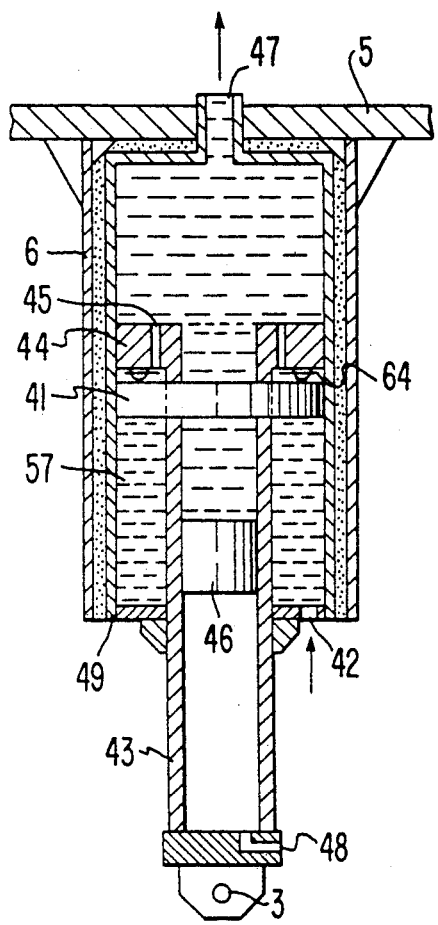
FIG. 4 is a front elevation, in section, of a further embodiment of a telescopic assembly, in which the telescopic tube functions as a so-called plunger piston.
Figure 5:
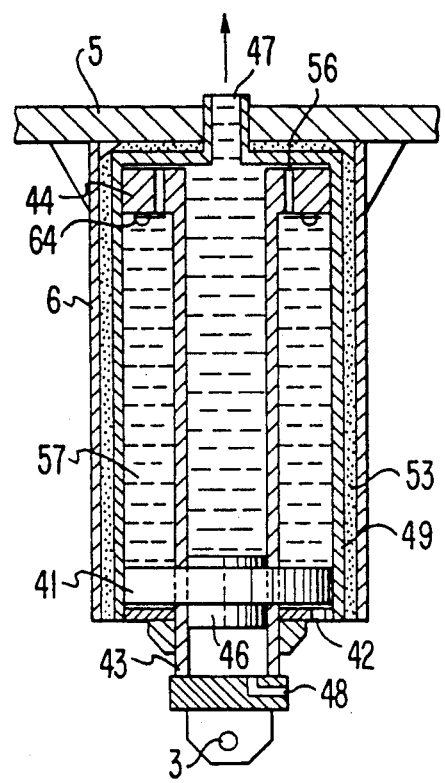
FIG. 5 is a front elevation, in section, of the apparatus of FIG. 4 with the telescopic tube completely inserted in the jacket tube.
Figure 6:
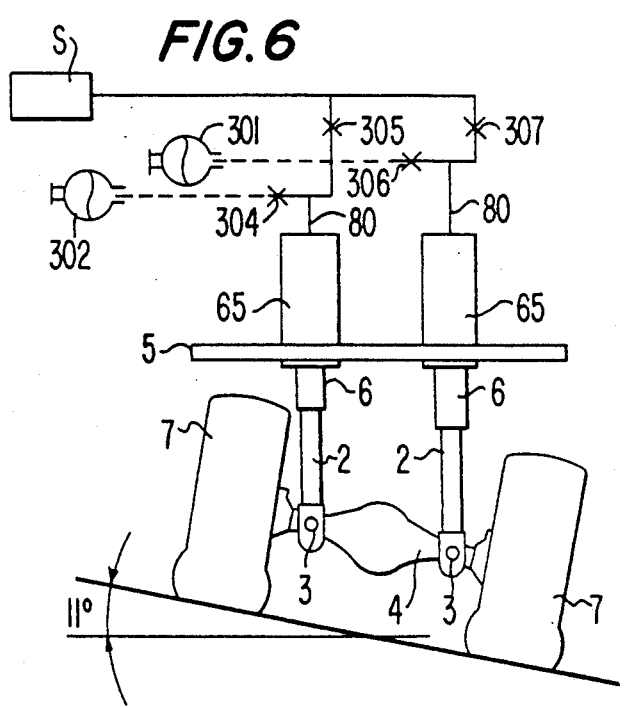
FIG. 6 is a schematic diagram showing the levelled position of a vehicle axle with respect to the chassis in a sloping position.

FIG. 4 and FIG. 5 show another embodiment of the telescopic assembly, in which the telescopic tube 43 operates as a so-called plunger piston. As the piston 44 has passage holes 45, part of the oil can flow outside the telescopic tube, whilst the other part of the oil presses piston 46 against the lower part of telescopic tube 43 which is filled with air or another gas.

These figures also show an annular piston 41 by means of which piston 44 and therefore telescopic tube 43 can be drawn into guide tube 49 by injecting oil under pressure through an opening 42. Thus, e.g. in the case of a mobile crane, the axles can be raised from the ground. At the passage holes 45 are fitted steel diaphragms 64, which as a result of their blocking valve action, delay the sliding back of the telescopic tube and therefore the springing out of axle 4, so that a shock absorbing effect is achieved.

FIG. 5 shows the same embodiment as FIG. 4 with completely inserted telescopic tube 43. Through the opening 47, which is connected to a regulating system, it is possible to completely lower or level-regulate the vehicle by operating the piston 41, e.g. for loading or level regulation purposes.

FIG. 6 shows one of the possible functions when using the described measures, namely the position of a vehicle levelled in the sloping position. The slope is approximately 11° which is a not infrequently occurring divergence from the horizontal. It is possible to see the mounting housings 65 in the chassis to which can be connected, by means of T-pipes 80 and leading away lines, regulating system S and hydraulic spring accumulators 301, 302 (FIG. 3), which are in turn connectable by control valves 304, 305, 306, 307 to the telescopic assemblies.

Figure 7:
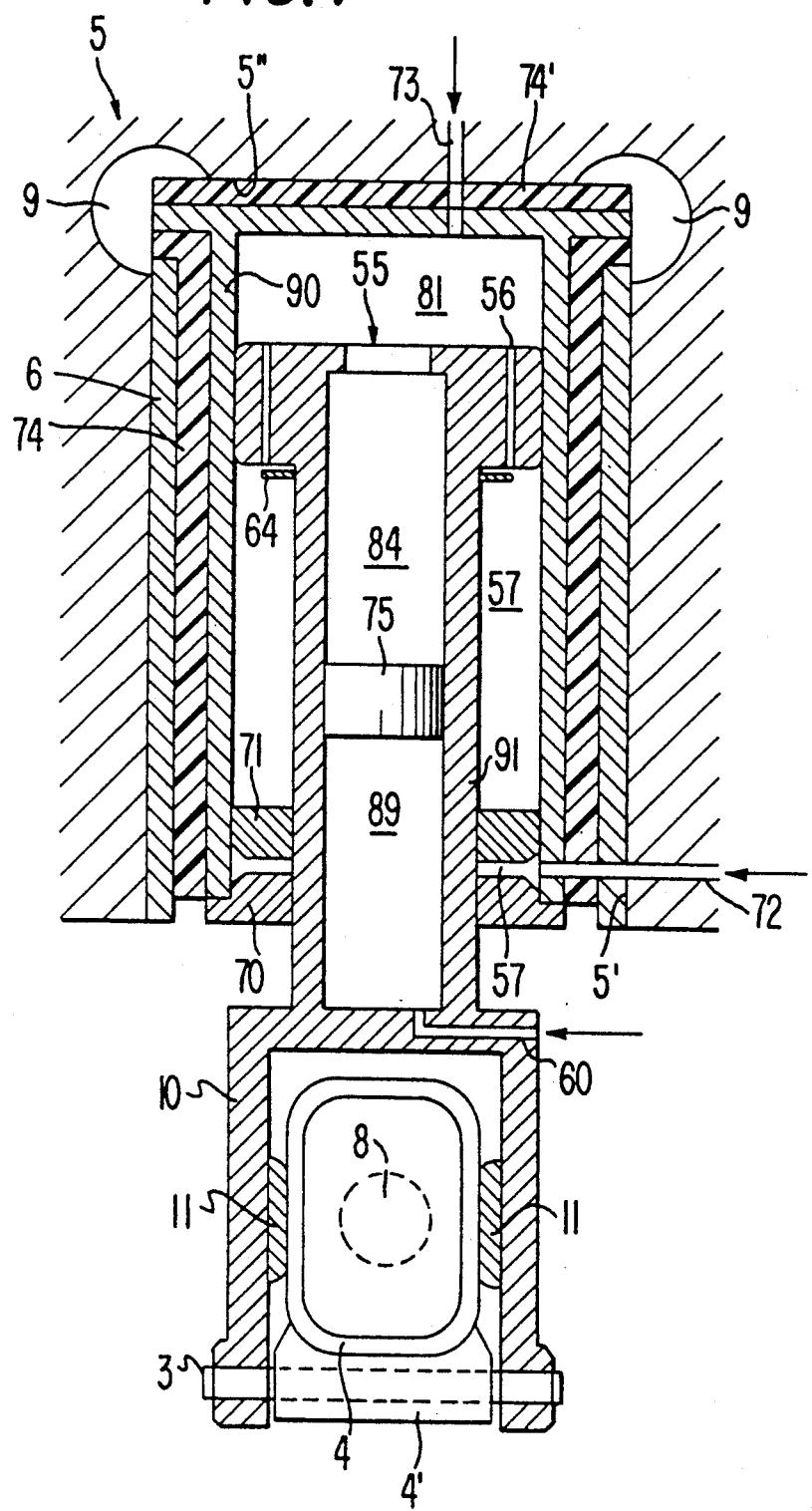
FIG. 7 is a front elevation, in section, of further embodiment of a telescopic assembly inserted in the vehicle frame.

FIG. 7 shows another embodiment of a robustly constructed assembly, with a somewhat modified mounting tube and installed in a recess in the vehicle frame or chassis 5 intended for the axle suspension mechanism. In the usually cylindrical recess 5' in the vehicle chassis, which is provided on the cylinder bottom 5" with an annular groove 9, an elastic layer 74' is arranged between the casing tube 90, i.e. the telescopic cylinder, and the cylinder bottom 5". The mounting tube 6 is fixedly fitted into the cylindrical recess 5' and the elastic layer 74 arranged between jacket tube 90 and mounting tube 6 is shaped to fit tightly in the vicinity of annular groove 9. This arrangement of the mounting tube 6, elastic layer 74 and jacket tube 90 absorbs the solid-borne sound of the gears which can be transferred via drive 8 and axle 4 to telescopic tube 91 and also the axle noise, which is consequently not completely transferred to the chassis surfaces having a droning tendency. As stated, this leads to the necessary transverse mobility between chassis and axle suspension. As in FIGS. 4 and 5, a working piston constructed as a plunger is introduced into the jacket tube, the piston having oil passage channels 45 and upstream-connected, flow-delaying steel disks 64. The working piston 44 has an opening at the top which connects the upper piston zone 81 with the upper zone 48 in the telescopic tube. A separating piston 75 is arranged for suspension purposes in the telescopic tube and separates a compressible fluid in zone 89 from an incompressible fluid in zone 84. Below the working piston 44 in zone 57 is arranged an annular piston 71 surrounding the telescopic tube 91 and whose function has been explained relative to FIGS. 4 and 5.

At three points inlet/outlet channels for fluids are provided, so that specific functions can be maintained. A first fluid channel 73 permits the passage of an incompressible fluid, in this case an oil, which is introduced under pressure into zone 81 against the working piston, so that e.g., through extension of the telescopic tube 91 with the axle 4 fixed thereto, slope compensation is made possible. The plunger also leads to a basic suspension action. The same passage can also be connected with an engageable hydropneumatic suspension (as shown in FIG. 3), in order to increase the spring displacement, i.e. to obtain an additional suspension. A second fluid channel 60 in the telescopic tube 91 to the zone 89 under the separating piston 75 permits the passage of a compressible fluid, in this case compressed air, in order to influence the vehicle suspension. A third fluid channel 72 permits the passage of an incompressible fluid, in this case again oil, so that through the pressurization of annular piston 71, the telescopic tube (as in FIG. 4) can be drawn into the jacket tube 90. This function permits the raising of the axle from the ground, if the vehicle, e.g. a crane, is to be placed on static supports.

The space in jacket tube 90 is closed by a cover 70 which also guides the telescopic tube. An axle suspension fork 10 is preferably shaped onto part of the lower telescopic tube projecting out of the cover and in which, by means of a through-pin 3, suspension takes place of axle 4, 4' and axle drive 8. In said suspension fork the axle can only be pivoted perpendicularly to the drawing plane and the rotation in the latter, i.e. the direction of travel, is prevented according to the invention by this suspension type. Support jaws 11 are provided for supporting the axle in the suspension fork in the case of the expected powerful torques.

The presently discussed axle suspension by means of the telescopic assemblies makes it possible to fulfil all the aforementioned functions, such as suspension, additional suspension, slope compensation, axle raising, etc., whilst obtaining advantages such as limited space requirements, noise damping, transverse mobility, etc. on the basis of a single concept or a single assembly.

Figure 8:
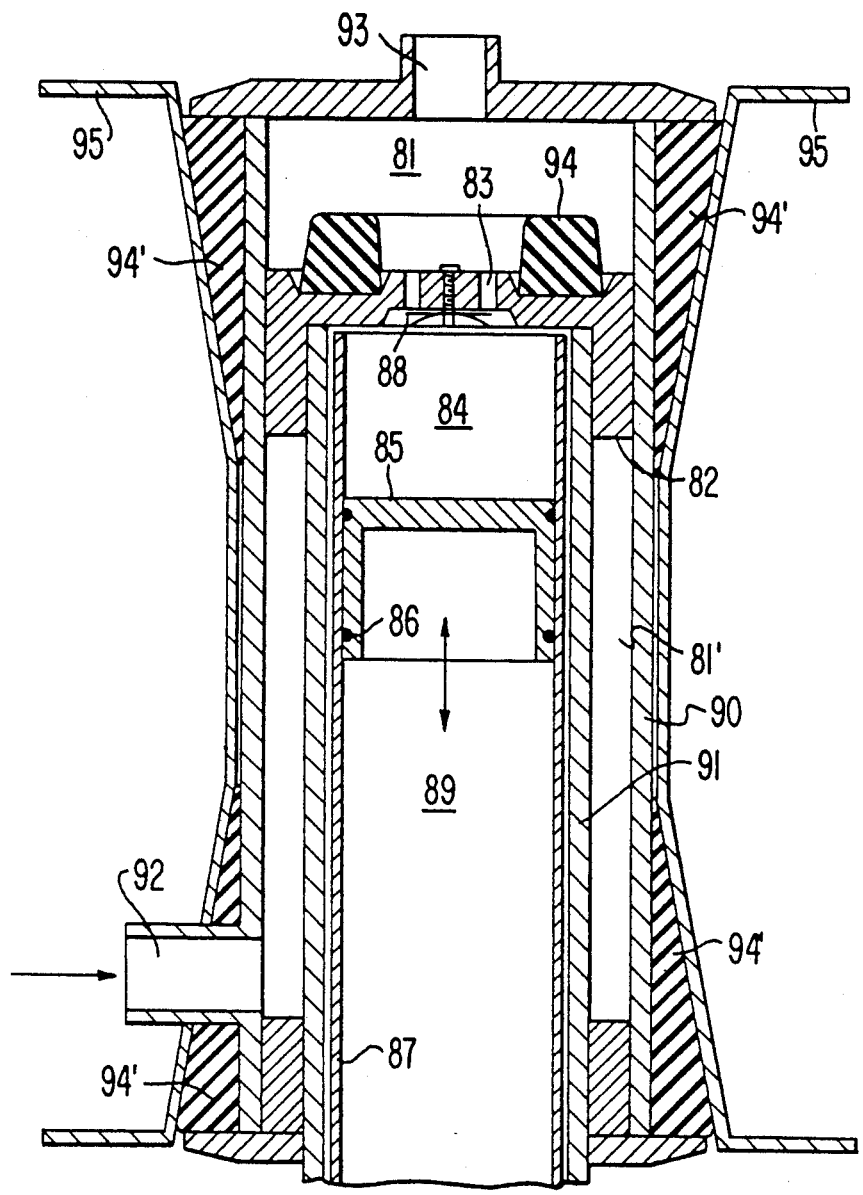
FIG. 8 is a front elevation, in section, of a still further embodiment of a telescopic assembly with a large telescopic tube.

FIG. 8 shows another variant of the telescopic assembly with a large telescopic tube 91. The gap between the telescopic tube 91 and the jacket tube 90 is kept small. The opening 92 only serves for oil supply purposes when the axle is to be raised, i.e. in order to draw the telescopic tube into the jacket tube. Opening 93 provides a connection to the hydraulic system and also serves for connection to an engageable and disengageable connection to a spring accumulator of the type shown in FIG. 3. For absorbing very severe impacts an annular rubber buffer 94 is provided above piston 82. A small guide tube 87 is fixed to the lower end of telescopic tube 91 and has a small spacing from the telescopic tube and serves to compensate any sag of the main telescopic tube during braking maneuvers, so that the oleo-pneumatic piston 85 can move up and down in an unimpeded manner in the guide tube. This prevents temporary jamming of the piston in the case of brief, slight bending of the telescopic tube. As a result of the considerable overall size of the large telescopic tube, a large amount of oil can be received in the upper hydraulic chamber 81. Thus, the springing-in path is increased. During springing-in, the oil collected at the top flows from chamber 81 through the circularly arranged holes 83 into the space 84 of the telescopic tube and presses the piston 85 downwards counter to the air or gas pressure in zone 89. However, on springing out, the rapid return flow of the oil is inhibited by the steel disks 88 acting as blocking valves, so that here again a shock absorbing effect is obtained.

The jacket tube 90, is mounted in two circularly and conically directed rubber buffers 94, which are in turn supported on a correspondingly shaped, outer mounting tube 95, which is fixed to the vehicle body. The conical, end-widening shape permits larger tilting of the telescopic assembly, without bringing about bending of the telescopic tube. This "play" is very important in the case of heavy vehicles for functioning under extreme operating conditions.

Figure 9:
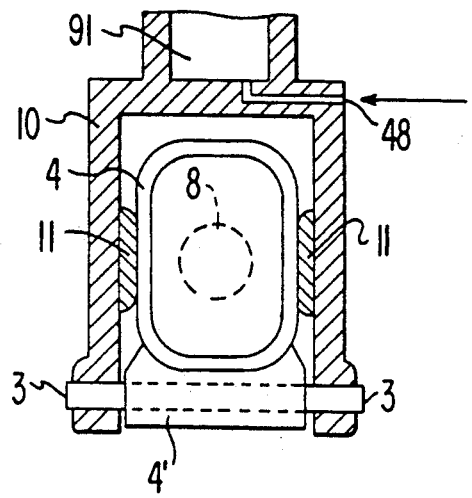
FIG. 9 is a partial sectional view of an embodiment of a hinge connection, which can connect an axle to the telescopic assemblies.

FIG. 9 shows an embodiment of a telescopic tube 91 guiding axle 4. Unlike in the case of FIG. 1, the articulation point and the fixing of the axle by means of the pins 3 is below the axle member 4. It is possible to see within the latter the axle drive shaft 8. A pressure gas can be supplied and removed through the fluid opening 48 (cf. also FIG. 4) in the lower gas pressure area 89, e.g. cf. FIG. 7.

The four spring elements in the case of a two-axle vehicle, or the six spring elements in the case of a three-axle vehicle, are all connected to a central hydraulic system by means of which it is possible to obtain vertical adjustment, terrain compensation, slope compensation, levelling and additional suspension by means of engageable spring accumulators.

For noise reduction and impact damping purposes, as well as for modifying the spacing of the articulation points 3 from axle 4, if the vehicle springs in to a marked extent in the manner shown in FIG. 6, between the jacket tube 91 and the support tube 94 fitted on the vehicle body is provided an elastic layer (plastic or rubber) 25, 53, or wedge-shaped rubber rings 94' (FIG. 8). It is also possible to secure one of the two jacket tubes, the second jacket tube being fixed by means of a rocker bearing in such a way that it, and the telescopic tube guided in it, can oscillate at right angles to the longitudinal axis of the vehicle to compensate for the aforementioned spacing change of the articulation points 3 during an inclined position of the axle, as shown in FIG. 6. The aforementioned telescopic tubes 2 are connected in jacket tube 6 with a hydraulic piston 20 (FIG. 2), which leads to the aforementioned double function. The jacket tube 6, with the axle-guiding telescopic tubes consequently form an assembly, which functions in much the same way a double-acting hydraulic cylinder. Oil supply or removal can take place through openings 22', 47 and 93. This makes it possible to raise or lower the vehicle, compensate vehicle slopes, achieve terrain compensation and bring about a so-called hydropneumatic suspension by connecting in a hydraulic membrane accumulator, as indicated e.g. by 30 in FIG. 3.

By means of a second or so-called trunk piston 41 cf. FIGS. 4 and 5, by introducing oil under pressure through opening 42, it is possible to raise the telescopic tube and with it the coupled vehicle axle. This is an enormous advantage, particularly for crane vehicles, where the heavy axles must be raised when working. This is because the entire vehicle weight must be supported on supports located further to the outside if the crane is to achieve its full lifting force. However, also for levelling a vehicle and for stabilization purposes, e.g. in the case of an armoured vehicle, the aforementioned means can be advantageous. Stabilization can be achieved in that oil is not allowed to flow out through the openings 22', 47, 73 above piston 20, 44, 55, so that the oleo-pneumatic piston 21, 46, 75 is pressed downwards, so that as a result of the high counterpressure any spring possibility of the vehicle body with respect to the chassis is at a minimum.

As has already been indicated, according to the invention the axle-guiding telescopic tubes 2, 23, 43, 91 are used in two functions as supports of a hydropneumatic suspension with simultaneous shock absorber function. Rapidly travelling vehicles have to overcome rapidly occurring impacts coming from the axles. For this purpose the oil quantity 81 above piston 82, which is suddenly under a high pressure, can pass out through the valve openings 83 into the interior of the telescopic tube 91 (FIG. 8). As the necessary counterpressure within the telescopic tube is provided a suspended separating piston 85 with seals 86, which seal the piston in tube 87. Its underside is filled with a fluid, gas or compressed air, which is under a pressure of e.g. 8 to 14 bar.

Fluid filling takes place via opening 48. As it is not possible to avoid a certain amount of leaking, i.e. a passage of air or gas into the oil area, it is necessary to be able to check the pressure, as well as the necessary refilling via valve actuation from the driver's cab (not shown in the drawings).

Thus, at the aforementioned valve openings 83 (FIG. 8), in the case of axle impacts, the highly pressurized oil 81 above the piston 82 can escape into a T-pipe 80, to which can be connected by means of not shown engaging means the hydropneumatic suspension (FIG. 3) and the central hydraulic system (FIG. 6). At holes 83 are provided steel diaphragm members 88, whose function is to allow the fluid, in this case oil, to flow rapidly from top to bottom, the piston 85 being pressed downwards against the compressed air or gas. In order to prevent a rapid "springing back" of the piston 82, 85, as well as axle 4, the members 88 approximately close the inlet ports 83, so that after passing the ground unevenness or obstacle causing the impact or shock, the oil can only flow back slowly again from the telescopic tube into zone 84. Thus, the members or disks 88 lead to a shock absorption. As a result of this additional measure there is no need to fit the otherwise conventionally used shock absorbers. There would also not be sufficient space for such large shock absorbers of the type required for such heavy vehicles, i.e. the loading surface would have had to have been positioned at a higher level and would have led to the aforementioned disadvantages.

Large vehicles necessarily have large wheels, large, solid axle bodies, require a large braking system, etc. If it was then necessary to fit a loading ramp, drive means, cab, etc., the overall vehicle height with the present wheel suspensions and the like would become much too high. In order to avoid this with the conventional chassis/structure technology, the vehicles would have to be made correspondingly wide. However, this is not possible, because e.g. the road traffic regulations in virtually all industrial countries fix the maximum width of road vehicles to 2.5 metres. The situation is somewhat different with large construction and earth moving vehicles which, if not used on public highways, can be constructed with virtually random widths. However, the disadvantage of excessive width arises when such a vehicle has to be moved from one place to another.

Figure 10:
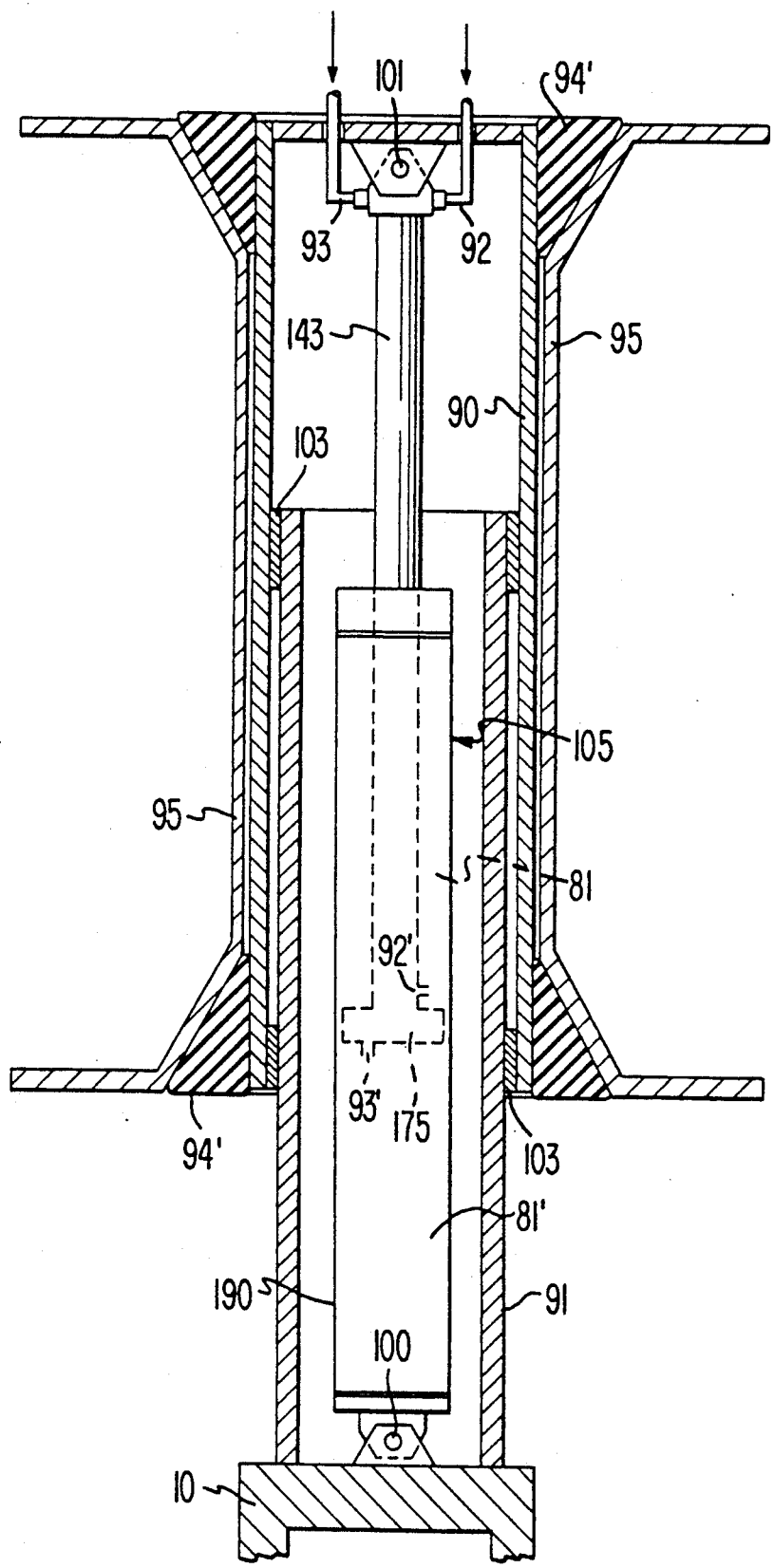
FIG. 10 is a front elevation, in section, of yet another embodiment of a telescopic assembly with a double-acting hydraulic cylinder located in the interior of a jacket tube and the telescopic tube for adjusting the slope and raising the axle.

FIG. 10 shows another embodiment of a telescopic assembly with a double-acting hydraulic cylinder for slope adjustment and axle raising arranged in the interior of the jacket tube and telescopic tube. Much as in the case of the embodiment of FIG. 8, the jacket tube 90 is held in the mounting tube 95 in resilient manner by two wedge-shaped rings 94', so that the transverse mobility is maintained and the conduction of solid-borne sound is prevented. Telescopic tube 91 is displaceably arranged in the jacket tube and centred by means of bearing bushing 103. The fork-like means 10 for fixing the not shown axle is welded to the telescopic tube. Within the telescopically extendable arrangement 90, 91, a double-acting hydraulic cylinder assembly 105 is suspended on articulated connections 100, 101 and with the aid thereof it is possible to achieve the aforementioned slope compensation and axle raising. Assembly 105 comprises a cylinder 190 and a working piston 175 on a piston rod 143 arranged therein. Two fluid supply lines 92, 93 lead through the piston rod and openings 93', 92' into zones 81 above and into zone 81' below, the working piston. The fluid, e.g. oil, supply lines are connected to a central hydraulic means. Obviously it is also possible to provide in piston rod 143 a separating piston, so as to achieve a basic suspension by introducing a compressible fluid, this possibility not being shown here. The suspension can also be obtained by connecting in a hydraulic accumulator as in FIG. 3, cf. FIG. 6.

In place of a double-acting hydraulic cylinder, it is possible by increasing the diameter of the first telescopic tube 91 to fix a second telescopic tube 143, inserted in the first, on the head side 101 of jacket tube 90 and its working cylinder 190 can be fixed to the head side 100 in the first telescopic tube 91, the latter being constructed without a working piston and thus directly slides on jacket tube 90, or is guided in the latter by means of bushing 103 or ball or roller bearings. In the gap between the bushings 103 and the jacket tube/telescopic tube 90/91 is preferably provided a lubricant supply. The thus trapped air zone acts together with the engageable hydropneumatic spring elements as a basic suspension. By means of connections 92, 93 it is also possible to connect an engageable hydraulic system, which realizes the vertical adjustment, slope compensation and axle raising.

I claim:

1. An axle suspension forming the connection between an axle housing and the chassis of a heavy or special vehicle having a longitudinal axis comprising the combination of
    at least two mounting tubes fixedly attached to the vehicle chassis; and
    a telescopic assembly operatively associated with each of said mounting tubes, each said telescopic assembly comprising
        a jacket tube enclosed in said mounting tube,
        a layer of resilient, elastic material between and in contact with said jacket tube and said mounting tube,
        a telescopic tube axially displaceable within said jacket tube, said telescopic tube including at one end thereof a working piston slidable within said jacket tube, and
        a pivot connection at the other end of said telescopic tube connected to said axle housing such that said housing is pivotable only about an axis parallel to the longitudinal axis of said vehicle.

2. An axle suspension according to claim 1 wherein said telescopic assembly includes fluid pressure inlet means for vertical adjustment and slope compensation of said vehicle.

3. An axle suspension according to claim 2 and further comprising a second piston slidable within said telescopic tube.

4. An axle suspension according to claim 1 wherein said jacket tube further comprises
    first and second supply and discharge openings for the passage of fluid under pressure into said jacket tube to act on opposite sides of said piston; and
    hydraulic system means connected to said first and second openings for selective supply and discharge of fluid thereto for control of slope, vertical adjustment, suspension and terrain compensation characteristics of said telescopic assembly.

5. An axle suspension according to claim 1 wherein said telescopic tube and jacket tube are shaped to define a gap therebetween for receiving fluid, said jacket tube including means defining an opening for admitting said fluid.

6. An axle suspension according to claim 1 wherein said telescopic tube has an inner surface shaped to receive a second piston axially freely slidable therein, said second piston having seal means for separating the interior of said telescopic tube into first and second spaces on the chassis and axle housing sides of said second piston, respectively, said first space containing an incompressible fluid and said second space containing a compressible fluid.

7. An axle suspension according to claim 6 wherein said working piston has one side directed toward said chassis and another side directed toward said axle housing, said piston including a plurality of openings extending therethrough to permit the passage of fluid from one side of said piston to the other, said piston further including blocking valve means for permitting free flow of fluid from the chassis side to the other side and for delaying flow of fluid in the reverse direction, said assembly thereby comprising the primary suspension of the vehicle with a shock absorbing effect.

8. An axle suspension according to claim 1 wherein said telescopic assembly includes a guide tube within said telescopic tube, said guide tube having an inner surface shaped to receive a second piston axially freely slidable therein, said second piston having seal means for separating the interior of said guide tube into first and second spaces on the chassis and axle housing sides of said second piston, respectively, said first space containing an incompressible fluid and said second space containing a compressible fluid.

9. An axle housing according to claim 8 wherein said working piston has one side directed toward said chassis and another side directed toward said axle housing, said piston including a plurality of openings extending therethrough to permit the passage of fluid from one side of said piston to the other, said piston further including blocking valve means for permitting free flow of fluid from the chassis side to the other side and for delaying flow of fluid in the reverse direction, said assembly thereby comprising the primary suspension of the vehicle with a shock absorbing effect.

10. An axle suspension according to claim 1 and further comprising
 a supply and discharge opening for the passage of fluid under pressure into said jacket tube to act between said piston and said jacket tube;
 hydraulic system means connected to said opening for selective supply and discharge of fluid thereto for control of slope, vertical adjustment, suspension and terrain compensation characteristics of said telescopic assembly,
 an hydraulic spring accumulator, and
 control valve means for selectively connecting said accumulator to said first opening for altering the suspension characteristics of said suspension.

11. An axle suspension according to claim 1 wherein said layer of resilient, elastic material comprises resilient wedge rings between said mounting tube and said jacket tube to allow transverse movement therebetween for compensation for distance changes between two pivot connections on the same axle housing when said vehicle is subjected to lateral forces.

12. An axle suspension according to claim 1 and further comprising
 an annular piston slidable relative to and surrounding said telescopic tube;
 a source of hydraulic fluid under pressure;
 means for selectively introducing fluid from said source into said jacket tube for forcing said annular piston toward said working piston to force said working piston and said telescopic tube toward said chassis, thereby lifting said axle housing when said chassis is separately supported.

13. An axle suspension forming the connection between an axle housing and the chassis of a heavy or special vehicle having a longitudinal axis comprising the combination of
 at least two mounting tubes fixedly attached to the vehicle chassis; and
 a telescopic assembly operatively associated with each of said mounting tubes, each said telescopic assembly comprising
 a jacket tube mounted in said mounting tube,
 means including elastic material between and in contact with said jacket tube and said mounting tube forming a resilient connection between said tubes,
 a first telescopic tube axially displaceable within said jacket tube,
 pivot connection means at an end of said telescopic tube connected to said axle housing such that said housing is pivotable about an axis parallel to the longitudinal axis of said vehicle, and
 a piston and cylinder assembly within said first telescopic tube, said piston and cylinder assembly being connected at one end to said pivot connection means and at the other end to said jacket tube.

14. An axle suspension assembly according to claim 13 and further comprising
 a source of fluid under pressure; and
 means for selectively delivering fluid under pressure to either side of said piston of said piston and cylinder assembly,
and wherein said cylinder of said piston and cylinder assembly is pivotally connected to said pivot connection means and said piston is pivotally connected to said jacket.

* * * * *